United States Patent
Kline et al.

(10) Patent No.: US 10,046,858 B2
(45) Date of Patent: Aug. 14, 2018

(54) DELIVERY OF PAYLOADS USING AIRCRAFT

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/165,118

(22) Filed: May 26, 2016

(65) Prior Publication Data
US 2017/0341747 A1   Nov. 30, 2017

(51) Int. Cl.
*B64D 1/12* (2006.01)
*G06Q 10/08* (2012.01)
*B64C 39/02* (2006.01)

(52) U.S. Cl.
CPC .............. *B64D 1/12* (2013.01); *B64C 39/024* (2013.01); *G06Q 10/087* (2013.01); *G06Q 10/08355* (2013.01); *B64C 2201/027* (2013.01); *B64C 2201/128* (2013.01)

(58) Field of Classification Search
None
See application file for complete search history.

(56) References Cited

U.S. PATENT DOCUMENTS

| | | | |
|---|---|---|---|
| 9,174,733 B1* | 11/2015 | Burgess | B64D 1/12 |
| 2009/0326808 A1* | 12/2009 | Blanton | G06Q 10/08 701/408 |
| 2011/0029413 A1* | 2/2011 | Ben-Tzur | G06Q 10/08 705/28 |
| 2014/0032034 A1 | 1/2014 | Raptopoulos et al. | |
| 2014/0330456 A1* | 11/2014 | Lopez Morales | G06Q 10/08355 701/3 |
| 2015/0120094 A1 | 4/2015 | Kimchi et al. | |
| 2015/0183528 A1* | 7/2015 | Walsh | B64F 1/32 701/3 |
| 2015/0248640 A1 | 9/2015 | Srinivasan | |
| 2015/0278759 A1 | 10/2015 | Harris et al. | |
| 2015/0332206 A1* | 11/2015 | Trew | G06Q 10/0836 705/330 |
| 2015/0363843 A1* | 12/2015 | Loppatto | G06Q 10/083 705/330 |
| 2016/0104098 A1* | 4/2016 | Matula | G06Q 10/083 701/23 |
| 2016/0371628 A1* | 12/2016 | Wilkinson | G06Q 10/083 |
| 2017/0091710 A1* | 3/2017 | Van Dyke | G06Q 10/0835 |
| 2017/0110017 A1* | 4/2017 | Kimchi | G08G 5/0069 |

* cited by examiner

*Primary Examiner* — Kevin P Mahne
(74) *Attorney, Agent, or Firm* — Cantor Colburn LLP

(57) ABSTRACT

Aspects of the disclosure include a method, system, and computer program for delivering a product. The method includes determining a delivery location and time for a payload using an aircraft. A recipient is notified of the delivery location and time. A first signal is received from the recipient. The time or location of the delivery location and time is changed, dynamically, based on the first signal. The payload is delivered to the recipient.

20 Claims, 6 Drawing Sheets

DELIVERY OF PAYLOADS USING AIRCRAFT

BACKGROUND

The present invention relates generally to a system and method for delivering payloads and, more specifically, to a system and method for delivering payloads such as products as products or packages using an aircraft.

Delivery services may use several modes of transportation in delivering a payload, such as a product or package for example, in transporting a payload from a warehouse to a customer. These modes of transportation may include aircraft, trucks, vans, automobiles and bicycles for example.

SUMMARY

Embodiments include a method, system, and computer program product for delivering a payload from an origination location to a delivery location. An aspect of the disclosure includes a method, system, and computer program for delivering a product. The method includes determining a delivery location and time for a payload with an aircraft. A recipient is notified of the delivery location and time. A first signal is received from the recipient. The time or location of the delivery location and time is dynamically changed based on the first signal. The payload is delivered to the recipient.

Additional features are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure are directed to a system and method for delivering a payload to an end destination using an aircraft. Embodiments of the present disclosure provide for the dynamic changing of temporal or geographic delivery information based on a recipient's desired delivery location and time. Embodiments of the present disclosure provide for the on-demand delivery of payloads to a recipient based on a signal from the recipient. Still further embodiments provide for the delivery of payloads to recipients within buildings.

Figure 1:
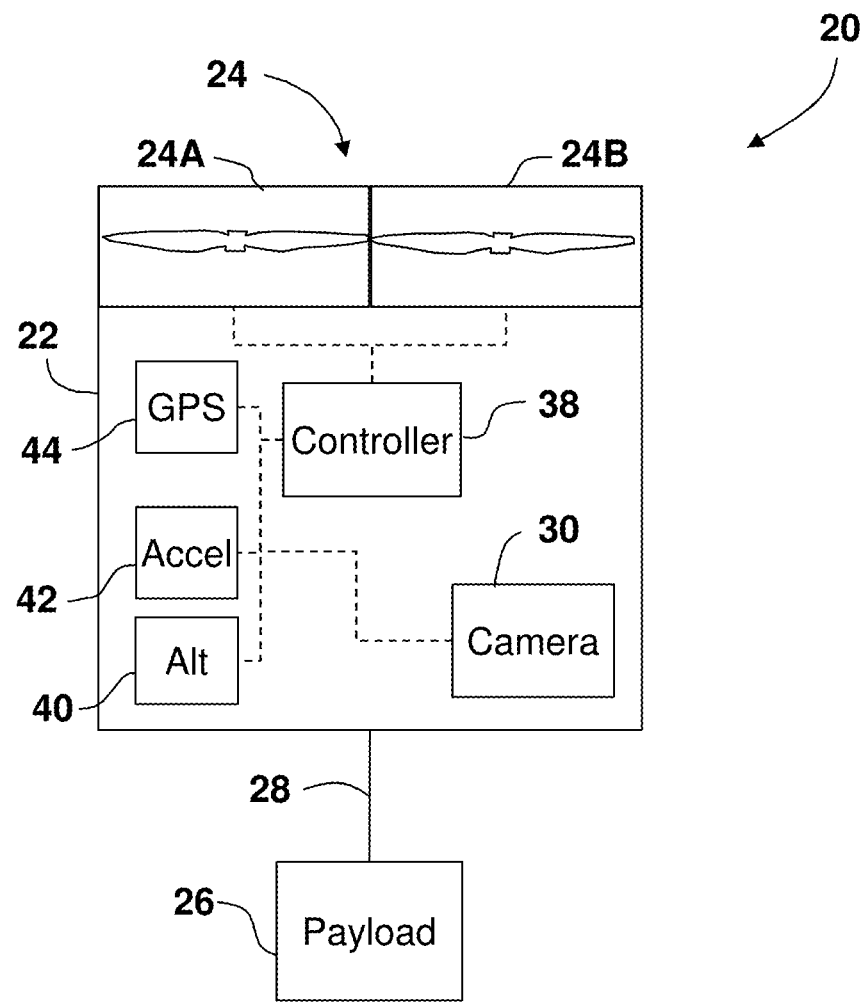
FIG. 1 depicts a block diagram of an aircraft in accordance with an embodiment of this disclosure.

Referring now to FIG. 1, an embodiment of an aircraft is shown. The aircraft 20 includes a fuselage 22 that supports, at least, one thrust device 24. In an embodiment, the aircraft 20 includes a plurality of thrust devices 24A, 24B, such as four thrust devices arranged about the periphery of the fuselage 22. In an embodiment, the thrust devices 24 include a propeller member that rotates to produce thrust. The thrust devices 24 may be configurable to provide both lift (vertical thrust) and lateral thrust (horizontal thrust). The vertical and horizontal components of the thrust allow the changing of the altitude, lateral movement and orientation (attitude) of the aircraft 20.

In the exemplary embodiment, the fuselage 22 and thrust devices 24 are sized and configured to carry a payload 26, such as a package or product for example. The payload 26 being releasably coupled to the fuselage 22 by a locking member, such as tether 28 or a cargo net. In an embodiment, the payload 26 may be contained within a cargo hold area within the fuselage 22. In another embodiment, the payload 26 may be suspended from the fuselage 22.

The aircraft 20 includes a controller 38 having a processing circuit. The controller 38 may include processors that are responsive to operation control methods embodied in application code. These methods are embodied in computer instructions written to be executed by the processor, such as in the form of software. The controller 38 is coupled to transmit and receive signals from the thrust devices 24, to determine and change their operational states (e.g. adjust lift from thrust devices 24, release payload 26). The controller 38 may further be coupled to one or more sensor devices that enable to the controller to determine the position, orientation and altitude of the aircraft 20. In an embodiment, these sensors may include an altimeter 40, a gyroscope or accelerometers 42 or a global positioning satellite (GPS) system 44. In an embodiment, the controller 38 may be coupled to one or more cameras 30. In an embodiment, the cameras 30 may be used for guidance (e.g., identify a bus) or verify delivery for example. In an embodiment, the controller 38 may be configured for automated or semi-automated flying operations or an unmanned operation.

Figure 2:
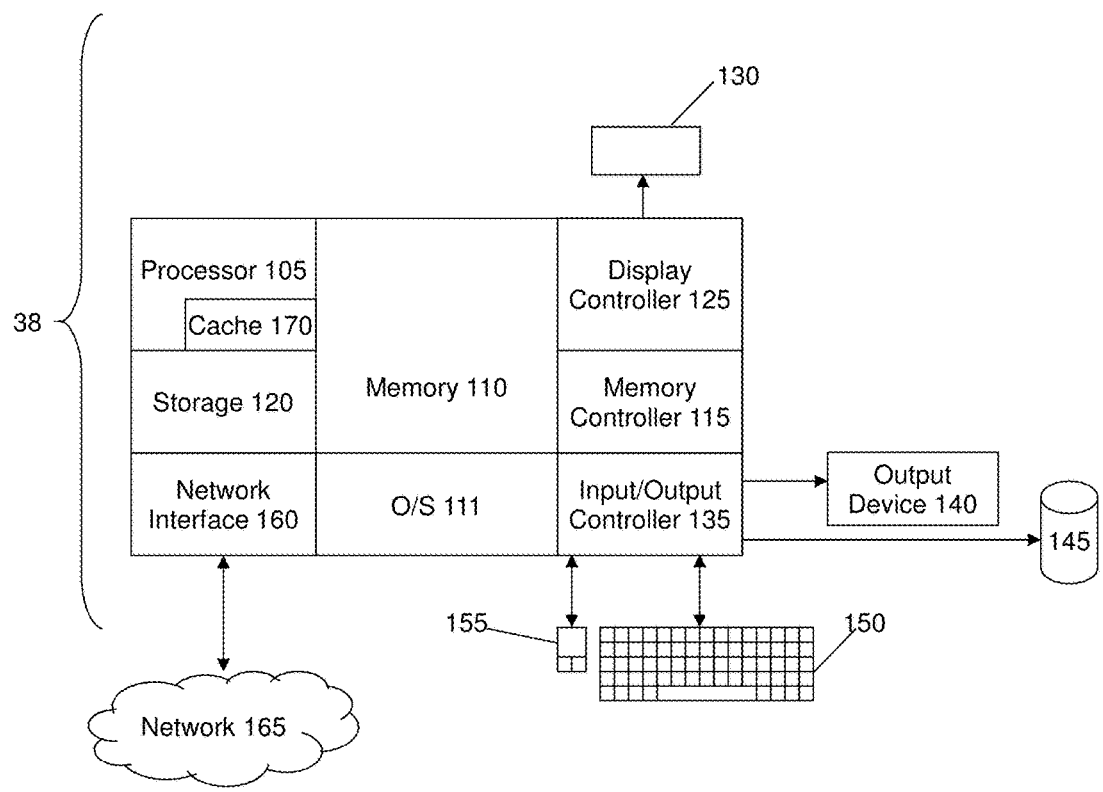
FIG. 2 depicts a block diagram of a controller for an aircraft in accordance with an embodiment of this disclosure.

FIG. 2 illustrates a block diagram of a controller 38 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose controller 38, such as a personal computer, workstation, minicomputer, or mainframe computer.

In some embodiments, as shown in FIG. 2, the controller 38 includes a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135 when the aircraft is docked to allow personnel to service or input information. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the controller 38, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

Figure 3:
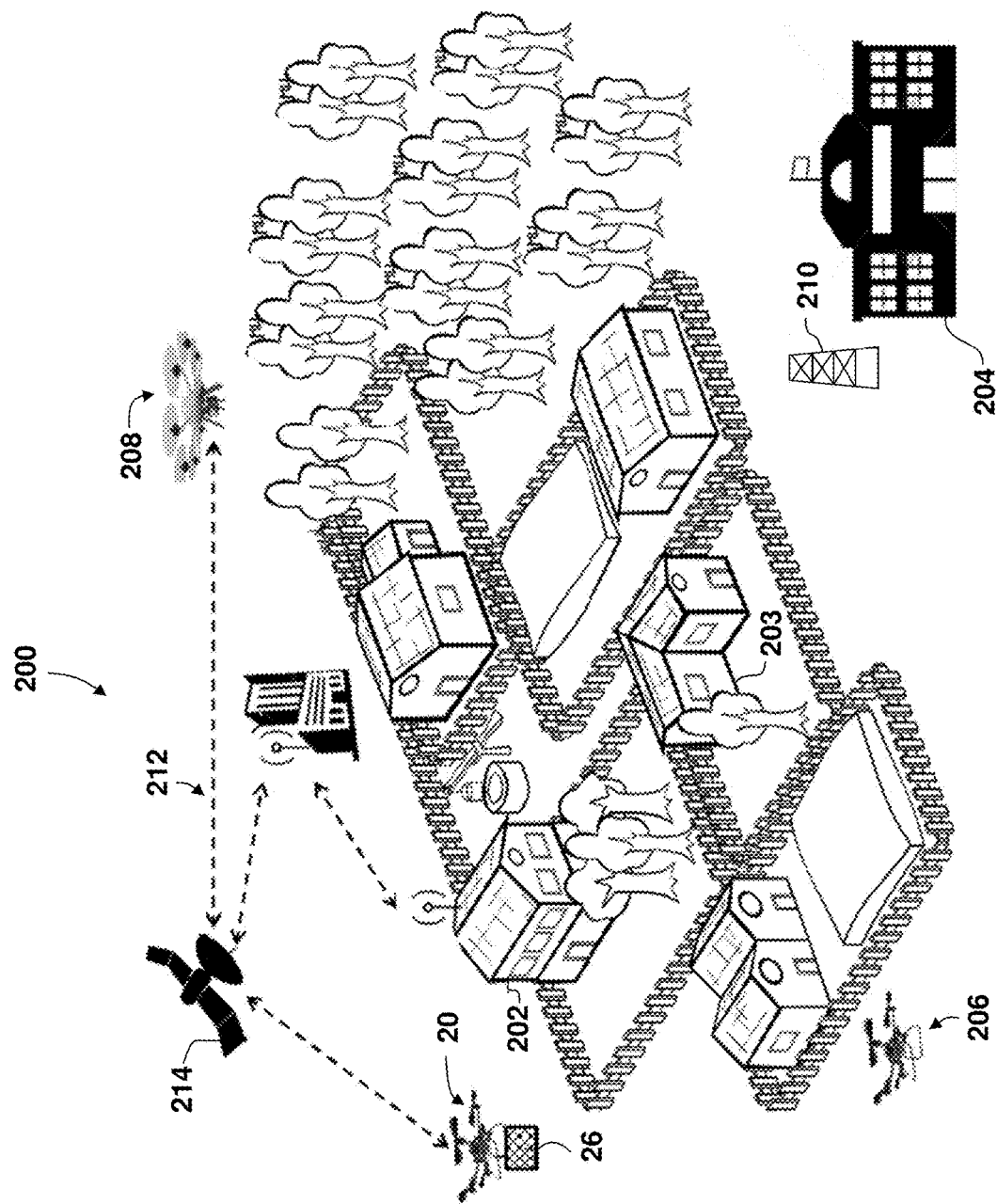
FIG. 3 depicts a perspective view of a payload delivery system using an aircraft in accordance with an embodiment of this disclosure.

The controller 38 may further include a display controller 125 coupled to a user interface or display 130. In some embodiments, the display 130 may be an LCD screen. In other embodiments, the display 130 may include a plurality of LED status lights. In some embodiments, the controller 38 may further include a network interface 160 for coupling to a network 165. The network 165 may be an IP-based network for communication between the controller 38 and an external server, client and the like via a broadband connection. In an embodiment, the network 165 may be a satellite network 214 (FIG. 3). The network 165 transmits and receives data between the controller 38 and external systems. In an embodiment, the external system may be another aircraft, a payload delivery system 200 (FIG. 3), a recipient, a mobile computing device carried by the recipient or an aircraft docking system, wherein the transmitting and receiving of data allows the controller 38 to identify a delivery location and time for delivery of the payload. In some embodiments, the network 165 may be a managed IP network administered by a service provider. The network 165 may be implemented in a wireless fashion, e.g., using wireless protocols and technologies, such as WiFi, WiMax, satellite, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in controller 38, such as that illustrated in FIG. 2.

Referring now to FIG. 3, an embodiment is shown of a product or payload delivery system 200 that uses aircraft, such as aircraft 20 for example, to deliver a payload from an originating location 202 (e.g. a warehouse) to a final destination such as residence 203 (e.g. a customer). In an embodiment, the system 200 is configured to provide delivery of the payload 26 to delivery locations. As will be discussed in more detail herein, the system 200 or the aircraft 20 notifies the recipient of the payload of a proposed time and location for the delivery and for the dynamic changing of the temporal or geographic parameters of the delivery based on the desire of the recipient.

In this embodiment, the system 200 provides for the routing of the aircraft 20 to an initial destination, such as a residence 203 or a building 204 for example. As discussed in more detail herein, the system 200 may coordinate with the recipient for the delivery of the payload at a different time, a different location or a combination of the foregoing. In still further embodiments, the delivery may include a delivery within the internal area of a building 204 or residence 203. In an embodiment, the system 200 includes a communication system 212 that allows the transmission of signals to aircraft 20, 206, 208, such as through a satellite based communications link 214. It should be appreciated that the communications link 214 may be cellular, radio frequency or a mesh communications type network. The signals transmitted to the aircraft 20, 206, 208 may include locations to pick up, transfer or deliver the payload, or the size and weight of the payload for example. The signals transmitted to the aircraft 20, 206, 208 may further include identification information that allows the carrying aircraft (e.g. aircraft 20) to dynamically change the delivery time, location or recipient during the delivery process. Where a change to the delivery location is beyond a region the aircraft 20 may deliver, such as due to a lack of fuel or flight restrictions for example, the aircraft 20 may cooperate with other aircraft 206, 208 to complete the delivery. In this embodiment, the aircraft 20, 206, 208 may be configured to transfer packages from a first aircraft to a second aircraft either in-flight or at a transfer platform, for example. In an embodiment, the aircraft 20, 206, 208 may be unmanned or autonomously operated aircraft allowing for the package transfer to occur with little or no intervention by a human operator.

Figure 4:
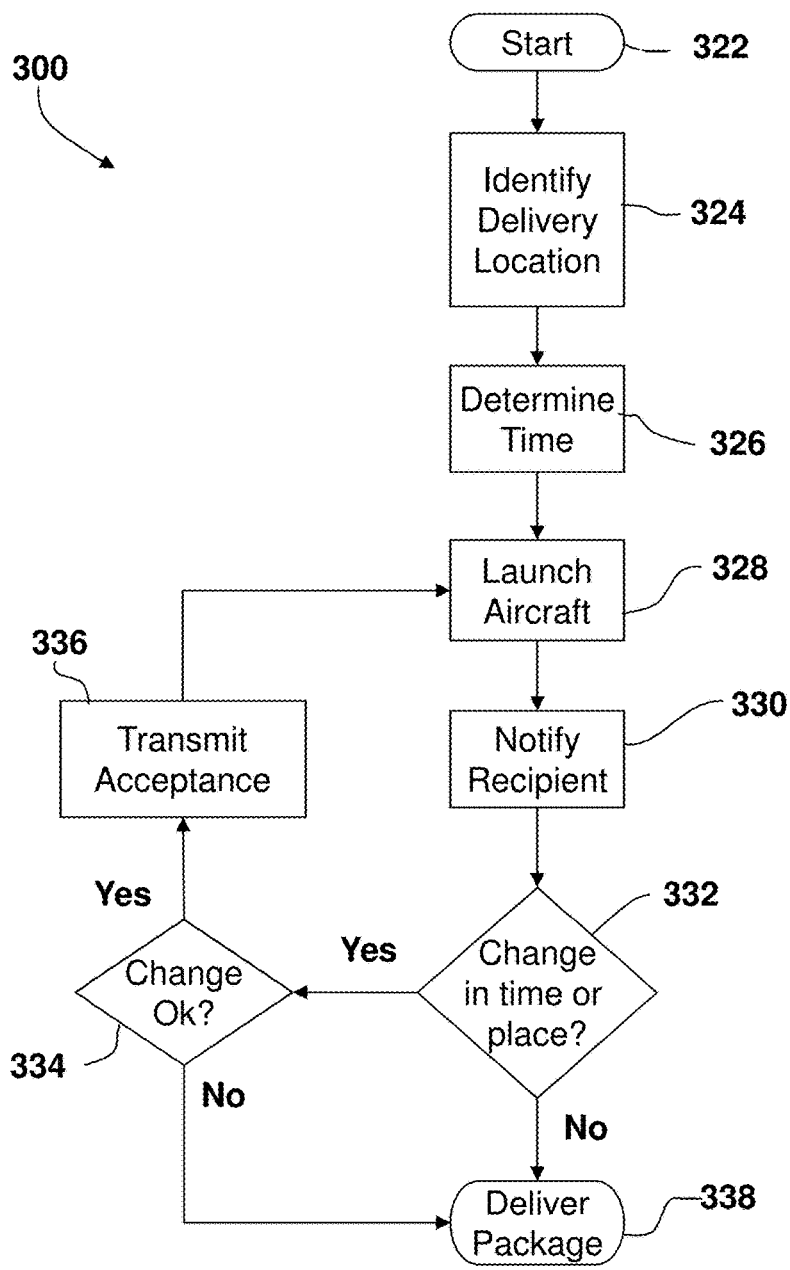
FIG. 4 depicts a flow diagram of a method of delivering payloads to a destination using aircraft, in accordance with some embodiments of this disclosure.

Referring now to FIG. 4 with continuing reference to FIG. 3, an embodiment of a method 300 is illustrated for delivering a payload using an aircraft. In this embodiment, the payload 26 is located at an origination location 202. The origination location 202 may be a warehouse, a depot or other facility where the package or payload is located. The method 300 starts in block 322 and proceeds to block 324 and identifies the delivery location, such as residence 203 for example, for the payload 26. This may be in response to an order placed by the recipient, or in anticipation of an order based on demographic information. When the delivery location is determined, a transit route may be determined from the origination location 202 to the delivery location.

Figure 6:
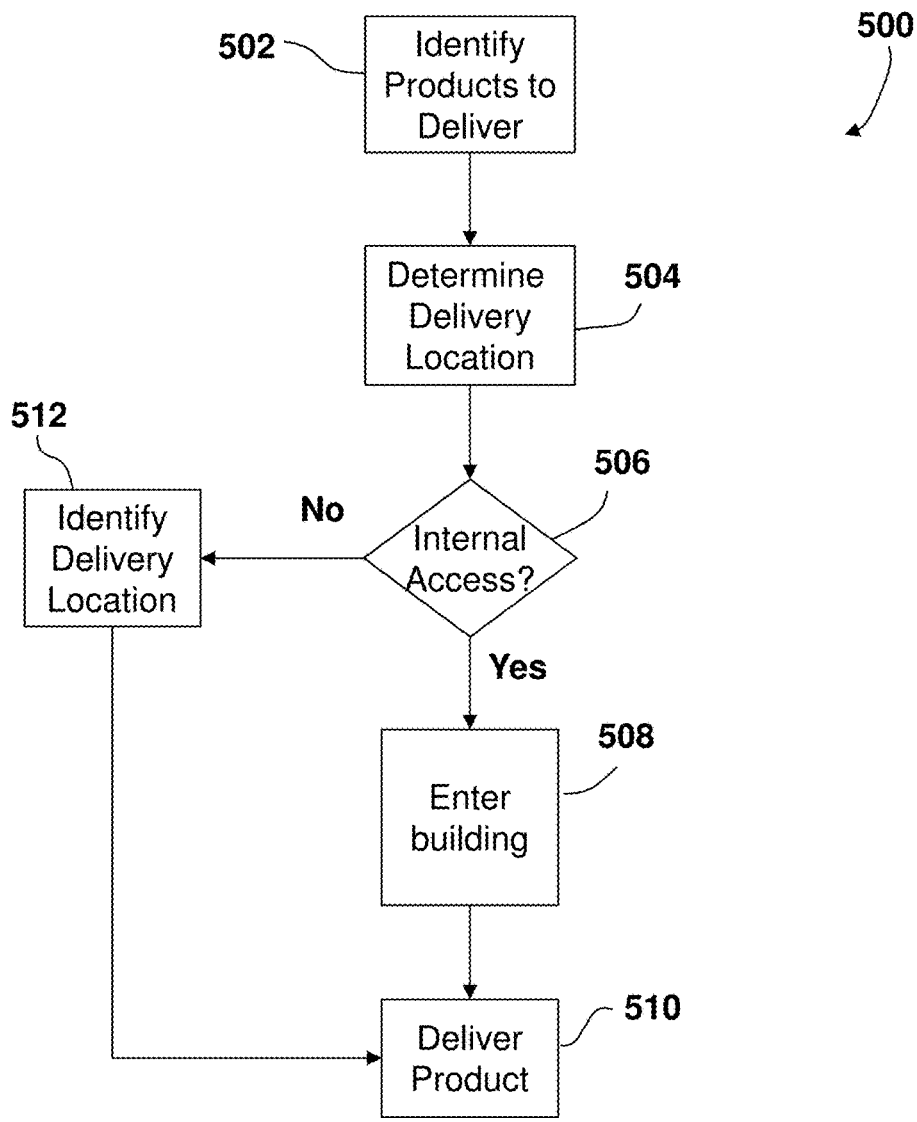
FIG. 6 depicts another flow diagram of a method of delivering a payload to a recipient within a building.

The method 300 then proceeds to block 326 where a delivery time is determined. It should be appreciated that in some embodiments, an end recipient may specify the delivery time and destination, such as in the order request for example. The method 300 then proceeds to launch the aircraft in block 328. The method 300 then proceeds to notify the recipient of the delivery location and the expected time of delivery in block 330. It should be appreciated that while FIG. 6 illustrates the notification of the recipient after launching the aircraft, this is for exemplary purposes and the claimed limitations should not be so limited. In other embodiments, the notification of the recipient may be timed to be delivered to the recipient a predetermined amount of time prior to the delivery (e.g. 30 minutes, 1 hour, 4 hours). In an embodiment, the predetermined amount of time may be defined or selected by the recipient. In still other embodiments, predetermined amount of time may depend on the payload being delivered, items such as perishable goods (e.g. milk) may have a different notification schedule than durable goods (e.g. paper towels) for example.

In an embodiment, the notification of the recipient may be in the form of a communications signal, such as but not limited to a cellular text message, a short message service (SMS) message, an electronic mail, or a computer-based instant message or a combination of the foregoing for example. The notification of the recipient may also be communicated through a computer application that is configured to transmit and receive messages from the system 200. In still another embodiment, the notification may be in the form of a telephone call to the recipient, such as with an automated calling service for example.

The method 300 then proceeds to query block 332 where it is determined if the recipient desires to change either the place or time of delivery. For example, the recipient may have originally believed they would be at home (e.g. residence 203) but had to stay late at work (e.g. building 204) and therefore will not be at the residence 203 at the expected delivery time. When the recipient does not desire for the delivery to be performed at the proposed time or place, the recipient may transmit a message or signal to the system 200 with a proposed alternative delivery time, location or combination thereof. When this occurs, the query block 332 returns a positive and the method 300 proceeds to query block 334 where the new desired location or time is received and evaluated.

As will be discussed further below with respect to FIG. 5 and FIG. 6, in an embodiment the identification of the delivery location in block 324 may include identifying products that may be delivered in anticipation of an order by a recipient (blocks 402-406, FIG. 5), or the identifying that the delivery location is within a building (block 504, FIG. 6).

The method 300 may then determine whether such a change in the time or location is feasible. This determination may be performed by a controller 38 on the aircraft, such as by determining the distance to the new proposed location change and determine if the aircraft 20 can successfully perform the delivery based at least in part on factors that include the speed of the aircraft, the amount of fuel remaining and other orders being fulfilled. In an embodiment, in response to receiving a request for a new location or time of delivery, the aircraft 20 determines its current position and determines a route to the new location. The aircraft 20 then determines based on the speed of the aircraft (such as an average operating speed or a maximum operating speed), whether the aircraft 20 can be in the new location at the desired time. The aircraft 20 also determines whether the aircraft 20 has sufficient fuel to traverse the route to the new location (based on the operating speed of the aircraft). If either the time condition or the fuel condition is not satisfied, then the requested change is denied. In one embodiment, the aircraft 20 may also determine if there are other payloads to be delivered that already have firm delivery time commitments. Where there are other such payloads, the aircraft 20 may determine if the requested delivery time and location may be performed while still delivering the remaining payloads on time.

For further example, the aircraft 20 delivery may also be subject to governmental, contractual or geographic restrictions that may limit when or where the payloads are delivered. In this embodiment, the aircraft 20 may use the GPS system 44 for the aircraft's current position, plan a route to the new proposed location and determine if the route intersects predetermined restricted locations that could prevent the aircraft from completing the delivery at the desired time. For example, if the new delivery location is within a predetermined distance from an airport and the flight of aircraft within that geographic region is restricted to aircraft that are landing or taking off from the airport, then the proposed delivery location may be declined. Other factors may include the delivery range of the aircraft. It should be appreciated that while embodiments herein refer to determining the feasibility of the time or location change with the aircraft, this is for exemplary reasons and the claimed invention should not be so limited. In other embodiments, one or more controllers remote from the aircraft that are in wireless communication with the aircraft may determine the feasibility of the change. In one embodiment, the change in the delivery time or place may result in additional costs that the recipient needs to accept before the delivery may be changed. This cost change information may be transmitted to the recipient for approval of the cost change prior to changing the delivery location or time.

If the change is acceptable, the query block 334 returns a positive and proceeds to block 336 where the acceptance is transmitted to the recipient. The method 300 then loops back to block 328 and the aircraft is launched at the appropriate time. In an embodiment, when the query block 334 returns a negative, or when the original proposed time and place is acceptable in block 332, the method proceeds to block 338 where the payload is delivered. In some embodiments, when the change in the delivery time or place is not acceptable to system 200, the recipient may have the option of cancelling the delivery. For example, if the delivery is of food for dinner and the recipient will not be there in time to receive it, the recipient may cancel the delivery.

In one embodiment, when evaluating whether to accept the recipient's proposed change to the delivery time or location, the system 200 may determine whether the payload may be delivered to a second recipient. In this embodiment, the system 200 may accept the change in delivery time or location and diverts the aircraft with the payload to the delivery location and of the second recipient.

Figure 5:
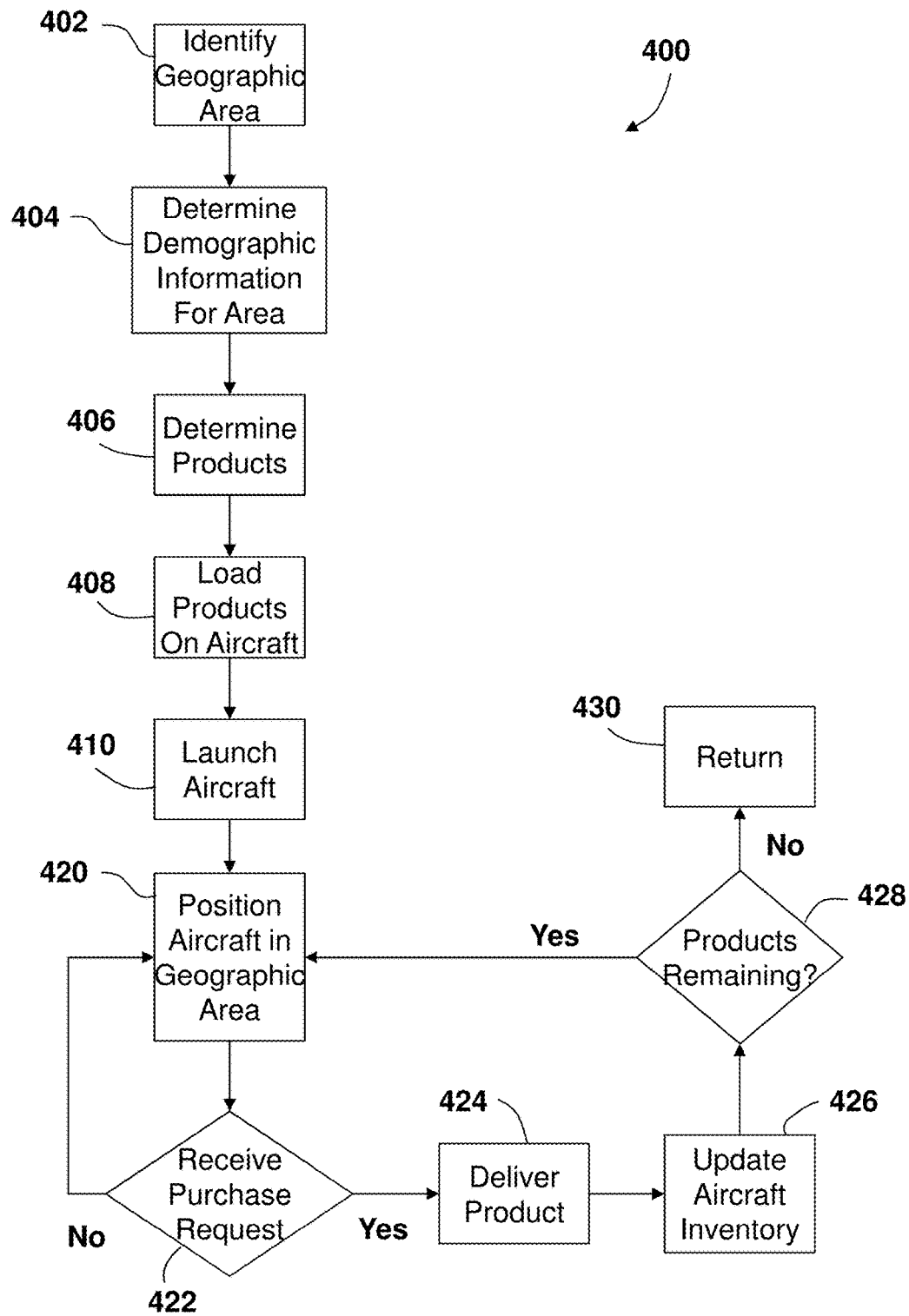
FIG. 5 depicts another flow diagram of a method for delivering a payload on demand in accordance with some embodiments of this disclosure.

Referring now to FIG. 5, with continuing reference to FIG. 3, a method 400 is shown for the delivery of payloads where the system 200 anticipates the purchase and delivery of the payload by the recipient. The method 300 starts in block 402 where the geographic area that the aircraft will deliver the payload is identified or defined. The method 300 then proceeds to block 404 where demographic information of the area may be determined and analyzed. This demographic information may include historical sales information for products sold in this area to determine which products individuals in the area purchase on a frequent or urgent basis. The method 400 then proceeds to block 406 where the products to be sold are determined. In an embodiment, the methodology enabled by blocks 402, 404, 406 may include identifying that the delivery location is within a building (block 504, FIG. 6). Where such a determination is in the affirmative, meaning that the delivery location is, in fact, within a building, the method 400 may perform one or more of the actions described in reference to the method 500 of FIG. 6 (e.g. determine whether internal access is allowed, block 506).

The method 400 then proceeds to block 408 where products are loaded as payloads into the aircraft and the aircraft is launched in block 410. The aircraft is then moved to the defined geographic area in block 420. The method 400 checks to see if a purchase request has been received from a recipient in the defined geographic area in query block 422. In an embodiment, the purchase request may be a purchase signal transmitted to the system 200 that then transmits the product information and location to the aircraft. In another embodiment, the aircraft may advertise within the geographic area what types of payloads (e.g. products) the aircraft may deliver. In an embodiment, the advertising may be in the form of a radio frequency transmission, such as WiFi or Bluetooth for example, that may be received by a computing device used by persons within the area. In other embodiments, the advertising may be delivered to the persons within the area through a private or public computer network.

In an embodiment, the system 200 may maintain the aircraft within the geographic area for a predefined period of time. If no signal is received from a recipient within the period of time, the aircraft may return to the origination location or be provided with an another geographic area where the aircraft may be repositioned.

When the query block 422 returns a negative, meaning no purchase requests have been received, the method 400 loops back to block 420. When the query block 422 returns a positive, meaning a purchase request has been received, the method 400 proceeds to block 424 where the payload is delivered. In an embodiment, the receipt of the purchase request may include additional information, such as but not limited to payment information and a delivery location. In some embodiments, the payment information may include an on-demand form of payment, such as a credit card for example, or the recipient may have pre-established account with the service that operates the aircraft and allows for automatic debiting of the account. In still further embodiments, the payment transaction may be performed at the time of delivery, such as with a card reader located on the aircraft. In an embodiment, the aircraft or the system 200 may transmit a message to the recipient prior to the delivery of the forms of payment that may be accepted. In an embodiment, the purchase request may also include a delivery time when the recipient will accept the delivery.

In an embodiment, the method 400 then proceeds to block 426 where the inventory of the payload is updated to account for the delivery. For example, the aircraft may "stock" a plurality of the same item (e.g. drink containers or sandwiches). In query block 428, the method 400 determines if the inventory of the payload is above a threshold, i.e., greater than zero. When query block 428 returns a positive, the method 400 loops back to block 420. When the query block 428 returns a negative, the method 400 proceeds to block 430 and the aircraft returns to the origination location.

Referring now to FIG. 6, with continuing reference to FIG. 3, a method 500 is shown of delivering the payload to a destination location within a building, such as building 204 for example. It should be appreciated that the method illustrated in FIG. 6 may be used in combination with the method 300 and method 400 in the delivery of payloads. In an embodiment, one or more of the actions of method 500 may be part of the inquiry block 324, 338 (FIG. 4) or blocks 402-406, 424 (FIG. 5) for example.

The method 500 begins in block 502 where the payload is identified. The method 500 then proceeds to block 504 where the location is identified. In query block 506 it is determined whether the building where the delivery is to be made provides internal access to aircraft. In this embodiment, when a building provides internal access to the aircraft, the aircraft may enter (e.g. fly) into the internal spaces within the building to complete the delivery. This may be done in facilities where multiple tenants/businesses are located for example. This may also allow for the automated delivery of perishable items, such as lunches or coffee for example.

When the building permits internal access, the query block 506 returns a positive and proceeds to block 508 where the aircraft enters the building. In an embodiment, the aircraft may execute an authentication protocol to allow the building egress system a means for identifying whether the aircraft is authorized to enter. Once in the building, the aircraft proceeds to deliver the payload in block 510.

When the query block 506 returns a negative, meaning that the building does not permit internal access for aircraft, the method 500 proceeds to block 512 where an alternative delivery location is identified. In some embodiments, the building may include an alternative delivery location such as a tower or landing platform 210 (FIG. 3) that is configured to receive payloads from aircraft. In an embodiment, the aircraft or the system 200 may communicate with the recipient, such as through an electronic message (e.g. a cellular text message), that the aircraft has arrived or will arrive at a particular time or place. The recipient may then confirm that they will exit the building and accept delivery of the payload in block 510. It should be appreciated that the types of payloads that may be delivered may include any product that is used by an individual or a business and that may be carried by the aircraft. Such as, but not limited to: coffee, soft-drinks, water, sandwiches, lunches, dinners, office supplies, copy/printer paper, pens, stationary, postal mail, courier packages, and the like.

It should be appreciated that the aircraft 20 may be an aerial vehicle configured as an unmanned vehicle that operates autonomously from a human operator to perform a predetermined function, such as deliver a payload or package for example.

Technical effects and benefits of some embodiments include providing a system for the delivery of payloads with an aircraft where a signal on the time and location of the delivery is transmitted to the recipient and the recipient may change the time or location of the delivery.

The terminology used herein is for the purposes of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining a delivery location and time for a payload, the payload to be delivered using an aircraft;
   notifying a recipient of the delivery location and time, wherein the notification is sent a predetermined amount of time before the delivery time and wherein the predetermined amount of time is based on a characteristic of the payload;
   receiving a first signal from the recipient, wherein the first signal includes a request to change the delivery location to a proposed alternative location and the delivery time to a proposed alternative delivery time specified by the recipient;
   dynamically changing the time and location of the delivery location and time based on the first signal; and
   delivering the payload to the recipient.

2. The method of claim 1, further comprising:
   determining when a cost associated with the delivery of the payload changes based on the first signal;
   transmitting a second signal to the recipient, the second signal including a cost change information; and
   receiving a third signal from the recipient, the third signal including information on approving the cost change.

3. The method of claim 1, further comprising delivering the payload to a second recipient based on the changing of the delivery time and location.

4. The method of claim 1, further comprising:
   determining the delivery location is within a building; and
   determining the building permits access to an interior of the building by the aircraft for the delivery of the payload.

5. The method of claim 1, further comprising:
   determining the delivery location is within a building;
   determining the building does not permit access to the interior of the building by the aircraft; and
   determining a second delivery location.

6. The method of claim 1, wherein the delivery location is a geographic area and the time is a period of time in which the aircraft may deliver the payload.

7. The method of claim 6, wherein the notifying the recipient comprises receiving a purchase signal from the recipient.

8. The method of claim 7, further comprising:
   updating an inventory of the payload on the aircraft based on delivering the payload to the recipient;
   determining the inventory is below a threshold; and
   returning the aircraft to an origination location.

9. A system comprising:
   a memory having first computer readable instructions; and
   one or more first processors for executing the computer readable instructions, the computer readable instructions comprising:
   determining a delivery location and time for a payload, the payload to be delivered using an aircraft;
   notifying a recipient of the delivery location and time, wherein the notification is sent a predetermined amount of time before the delivery time and wherein the predetermined amount of time is based on a characteristic of the payload;
   receiving a first signal from the recipient; wherein the first signal includes a request to change the delivery location to a proposed alternative location and the delivery time to a proposed alternative delivery time specified by the recipient;
   dynamically changing the time and location of the delivery location and time based on the first signal; and
   delivering the payload to the recipient.

10. The system of claim 9, wherein the computer readable instructions further comprise:
    determining when a cost associated with the delivery of the payload changes based on the first signal;
    transmitting a second signal to the recipient, the second signal including a cost change information; and
    receiving a third signal from the recipient, the third signal including information on approving the cost change.

11. The system of claim 9, wherein the computer readable instructions further comprise delivering the payload to a second recipient based on the changing of the delivery time and location.

12. The system of claim 9, wherein the computer readable instructions further comprise:
    determining the delivery location is within a building; and
    determining the building permits access to an interior of the building by the aircraft for the delivery of the payload.

13. The system of claim 9, wherein the computer readable instructions further comprise:
    determining the delivery location is within a building;
    determining the building does not permit access to the interior of the building by the aircraft; and
    determining a second delivery location.

14. The system of claim 9, wherein the delivery location is a geographic area and the time is a period of time the aircraft may deliver the payload.

15. The system of claim 14, wherein the notifying the recipient comprises receiving a purchase signal from the recipient.

16. The system of claim 15, wherein the computer readable instructions further comprise:

updating an inventory of the payload on the aircraft based on delivering the payload to the recipient;
determining the inventory is below a threshold; and
returning the aircraft to an origination location.

17. A computer program product for determining a route for delivering a payload from an origination location to a delivery location, the computer program product comprising a computer readable storage medium having program instructions embodied therewith, the program instructions executable by a processor to cause the processor to perform:
   determining the delivery location and time for the payload, the payload to be delivered using an aircraft;
   notifying a recipient of the delivery location and time, wherein the notification is sent a predetermined amount of time before the delivery time and wherein the predetermined amount of time is based on a characteristic of the payload;
   receiving a first signal from the recipient, wherein the first signal includes a request to change the delivery location to a proposed alternative location and the delivery time to a proposed alternative delivery time specified by the recipient;
   dynamically changing the time and location of the delivery location and time based on the first signal; and
   delivering the payload to the recipient.

18. The computer program product of claim 17, wherein the program instructions further comprise:
   determining when a cost associated with the delivery of the payload changes based on the first signal;
   transmitting a second signal to the recipient, the second signal including a cost change information; and
   receiving a third signal from the recipient, the third signal including information on approving the cost change.

19. A computer program product of claim 18, wherein the program instructions further include delivering the payload to a second recipient based on the changing of the delivery time and location.

20. The computer program product of claim 18, wherein the program instructions further include:
   determining the delivery location is within a building;
   determining the building permits access to an interior of the building by the aircraft for the delivery of the payload and delivering the payload within the building; and
   determining the building does not permit access to the interior of the building by the aircraft and determining a second delivery location for the payload.

* * * * *